(12) United States Patent
Kwasnick et al.

(10) Patent No.: US 6,721,077 B2
(45) Date of Patent: Apr. 13, 2004

(54) LIGHT EMITTING DEVICE ADDRESSED SPATIAL LIGHT MODULATOR

(75) Inventors: Robert F. Kwasnick, Palo Alto, CA (US); Kenneth E. Salsman, The Woodlands, TX (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 09/951,086

(22) Filed: Sep. 11, 2001

(65) Prior Publication Data

US 2003/0048517 A1 Mar. 13, 2003

(51) Int. Cl.[7] .............................. G02F 1/07; G02F 1/29
(52) U.S. Cl. ...................... 359/244; 359/241; 359/299; 359/242
(58) Field of Search ................... 359/244, 241, 359/299, 242

(56) References Cited

U.S. PATENT DOCUMENTS

| 5,073,010 | A | * | 12/1991 | Johnson et al. ............... 349/28 |
| 5,339,090 | A | * | 8/1994 | Crossland et al. ............. 345/90 |
| 5,467,215 | A | * | 11/1995 | Lebby et al. ................ 359/247 |
| 5,486,946 | A | * | 1/1996 | Jachimowicz et al. ....... 359/263 |
| 5,539,554 | A | * | 7/1996 | Lebby et al. ................ 359/247 |
| 5,543,958 | A | * | 8/1996 | Lebby et al. ................ 359/254 |
| 6,153,927 | A | * | 11/2000 | Raj et al. ..................... 257/680 |
| 6,348,991 | B1 | * | 2/2002 | Smith et al. ................. 359/321 |
| 2003/0048517 | A1 | * | 3/2003 | Kwasnick et al. ........... 359/237 |
| 2003/0052327 | A1 | * | 3/2003 | Kwasnick et al. ........... 257/103 |

* cited by examiner

Primary Examiner—David N. Spector
(74) Attorney, Agent, or Firm—Trop, Pruner & Hu, P.C.

(57) ABSTRACT

An optically addressed spatial light modulator may be formed with an integrated light emitting device display. The light emitting device display may be formed of a size and cost that optimizes the overall modulator design. In addition, by integrating the modulator and display devices, the overall size of the spatial light modulator may be reduced in some embodiments.

28 Claims, 3 Drawing Sheets

LIGHT EMITTING DEVICE ADDRESSED SPATIAL LIGHT MODULATOR

BACKGROUND

This invention relates generally to optical systems and elements and more specifically to optically addressable spatial light modulators or light valves.

A spatial light modulator is a class of optical device used for optical computation, switching and displays. A liquid crystal display is one type of spatial light modulator. The liquid crystal display is a two-dimensional spatial light modulator where the physical orientation, and hence magnitude of optical rotation, of a liquid crystal (LC) is modulated by an electric field. In combination with other polarizers in the light path, the intensity of light transmitted through the LC comprising element or light valve is modulated.

Generally, a spatial light modulator includes a modulating write or addressing mechanism. Conventionally, in spatial light modulators, the addressing mechanism is fully electrical, for example, using an active matrix amorphous silicon array to select the voltage at a given pixel's electrode.

However, optically addressed spatial light modulators are also known. In optically addressed spatial light modulators the voltage across the liquid crystal in the light valve is optically modulated by the exposure of the photoconductor layer to a write beam signal. The write beam is developed externally to the liquid crystal comprising element.

Spatial light modulators also include a read or output mechanism that may be simply the visible observation of the transmitted and modulated light. For a reflective liquid crystal display, the source of light for readout is on the same side of the liquid crystal comprising element. The write mechanism involves a read beam passing through the front side of the liquid crystal comprising element and being reflected back through the front side.

The optically addressed spatial light modulators tend to be bulky. The use of an external write beam takes up excessive space and necessitates optical alignment. Also the optically addressed partial light modulators tend to be expensive and mechanically awkward. Generally, light emitting device arrays are utilized to generate the write beam. These arrays are relatively expensive and not generally monolithic, but rather they are assemblages of large discrete devices.

Thus, there is a need for better ways to implement optically addressed spatial light modulators.

DETAILED DESCRIPTION

Figure 1:
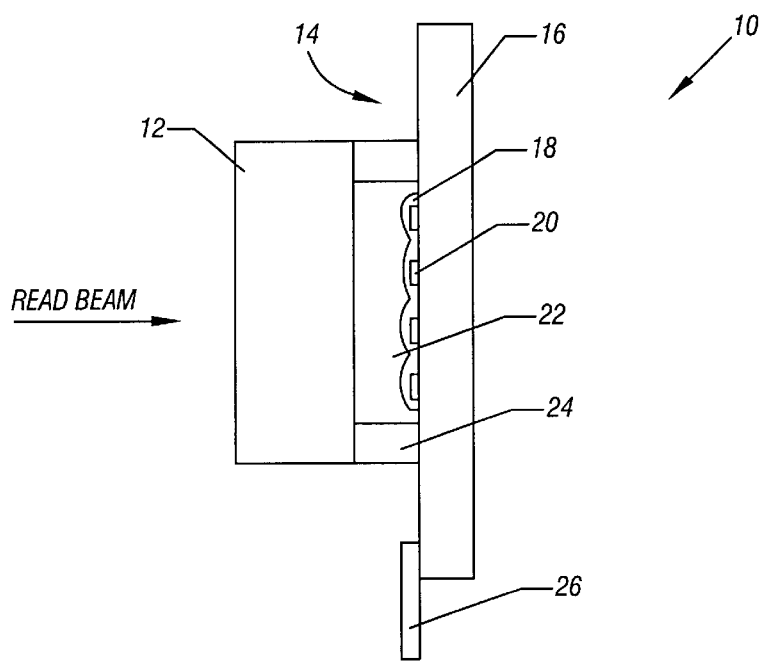
FIG. 1 is an enlarged cross-sectional view of one embodiment of the present invention.

Referring to FIG. 1, an optically addressed spatial light modulator 10 includes a light valve 12 that receives an external read beam as indicated. Integrated with the light valve 12 is an organic light emitting device (OLED) display 14. The display 14 may include a substrate 16, which in one embodiment may be a silicon integrated circuit. Organic light emitting devices 20 are formed on the surface of the substrate 16. The devices 20 may comprise organic materials, such as conjugated polymer or small molecule-based light emitting materials. The organic material may comprise one or more layers. Each device 20 forms a subpixel of an OLED display.

The devices 20 are covered by a passivation 18. Examples of passivation materials include silicon oxide or silicon nitride deposited by sputtering or plasma-enhanced chemical vapor deposition.

An index matching material 22 may be positioned between the passivation 18 and the light valve 12. The display 14 may be sealed by a sealant 24, such as epoxy. The sealant 24 and the passivation 18 together function to protect the devices 20 from the ambient since the deposits 20 may be subject to moisture and solvent damage.

In one embodiment, a flexible circuit 26 may be utilized to supply signals to the substrate 16 and its integrated components. Thus, addressing signals may be provided through the flexible circuit 26 to a passive matrix addressing system. Alternatively, the pixel drive signals may be developed on chip in an active matrix addressing circuit. The light from the organic light emitting devices 20 develop the write beam so no external write beam is required although the read beam may still be external to the assembly as shown in FIG. 1.

The index matching material 22 may have an index of refraction about equal to that of the substrate 16. The material 22 may have adhesive properties that assist the sealant 24 in bonding the display 14 to the light valve 12. In practice, small gaps may be left in the sealant 24 and the index matching material 22 may fill those gaps in one embodiment or an external sealant may be added to the gaps.

When appropriate current is driven through each device 20, it emits light. Generally, each device 20 may be sandwiched between a pair of spaced electrodes, one positioned between the device 20 and the substrate 16 and the other positioned on the opposite side that is substantially transparent. When current flows through a device 20, the device 20 emits light in a direction away from the substrate 16 in one embodiment. This light then is utilized to optically address the light valve 12.

Figure 2:
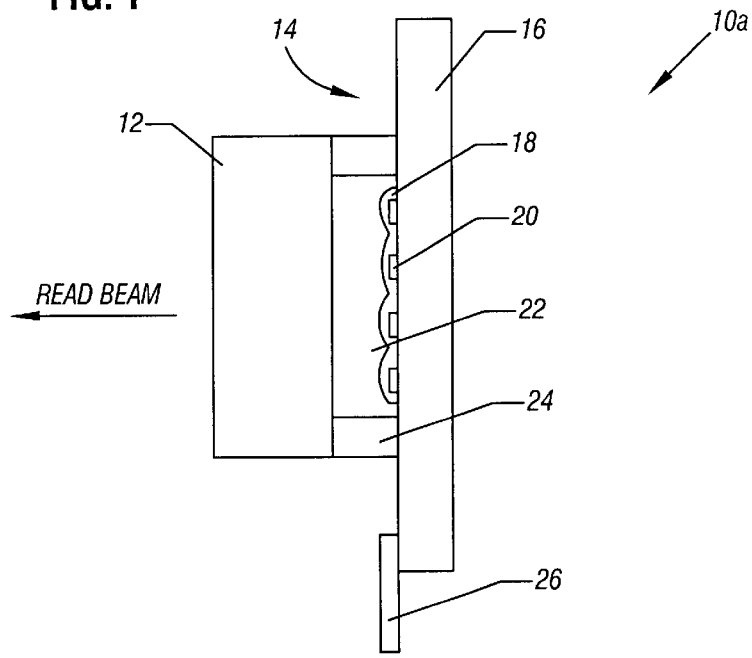
FIG. 2 is an enlarged cross-sectional depiction of another embodiment of the present invention.

Referring next to FIG. 2, an optically addressed spatial light modulator 10a is similar to the modulator 10 shown in FIG. 1, except that the light developed by the device 20 is actually utilized as the read beam. Therefore, no external read beam may be required.

Figure 3:
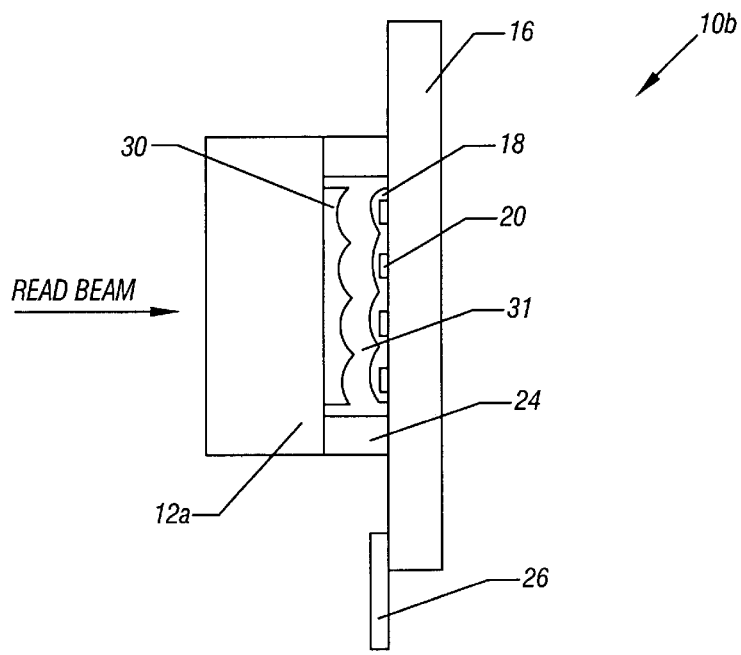
FIG. 3 is an enlarged cross-sectional view of still another embodiment of the present invention.

Referring next to FIG. 3, the optically addressed spatial light modulator 10b incorporates a microlens 30. The microlens 30 is formed on, or is attached to, the light valve 12a in one embodiment. Alternatively, the microlens 30 may be formed on the display 14.

The microlens 30 allows the light from the OLED display 14 to be controllably dispersed onto the light valve 12a, increasing the perceived fill factor of the read beam by modulating a larger area of the light valve 12a. This is particularly suitable for light valves 12a with continuous modulating material such as a photoconductor as opposed to light valves using PIN photodiodes. To facilitate light focusing, an air gap 31 may be left between the display 14 and the light valve 12a in one embodiment.

Figure 4:
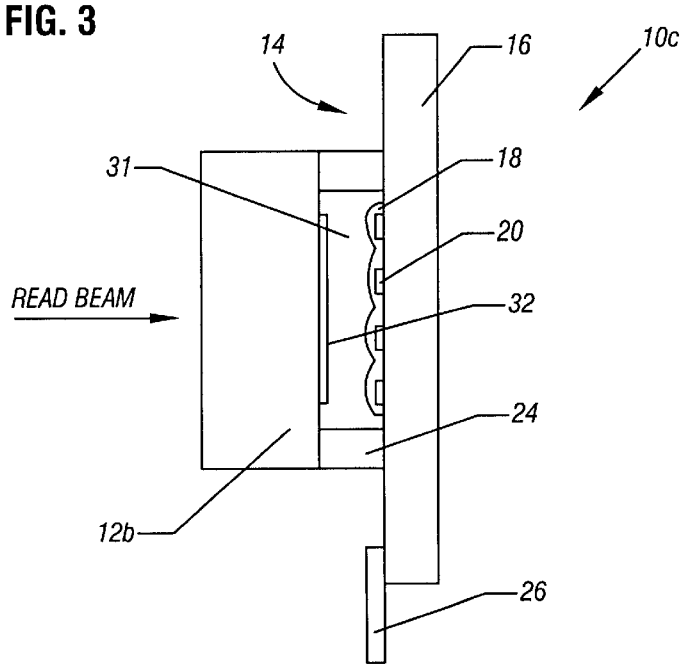
FIG. 4 is an enlarged cross-sectional view of but another embodiment of the present invention.

Turning next to FIG. 4, a color filter 32 may be formed on or attached to the light valve 12b. For example, the filter 32 may be a dielectric filter formed from inorganic materials such as alternating layers of silicon dioxide and titanium dioxide. As still another example, the filter 32 may be a color filter formed from dye containing organic materials. As still another alternative, the filter 32 may be formed on, or attached to, the display 14. Again, an air gap 31 may be left between the filter 32 and the rest of the display 14.

The OLED display 14 spectrum can be chosen to range from blue to red and into the infrared range through the use of a filter 32 in some embodiments. Therefore, the light output can be reduced to a suitably narrow band, and the output light may be optimized for specific modulating elements without interfering with the read beam. For example, with certain amorphous silicon PIN diodes, 514 nm. wavelength light beams may be beneficial. Other very narrow spectrum light beams can also be developed using the displays 14.

Figure 5:
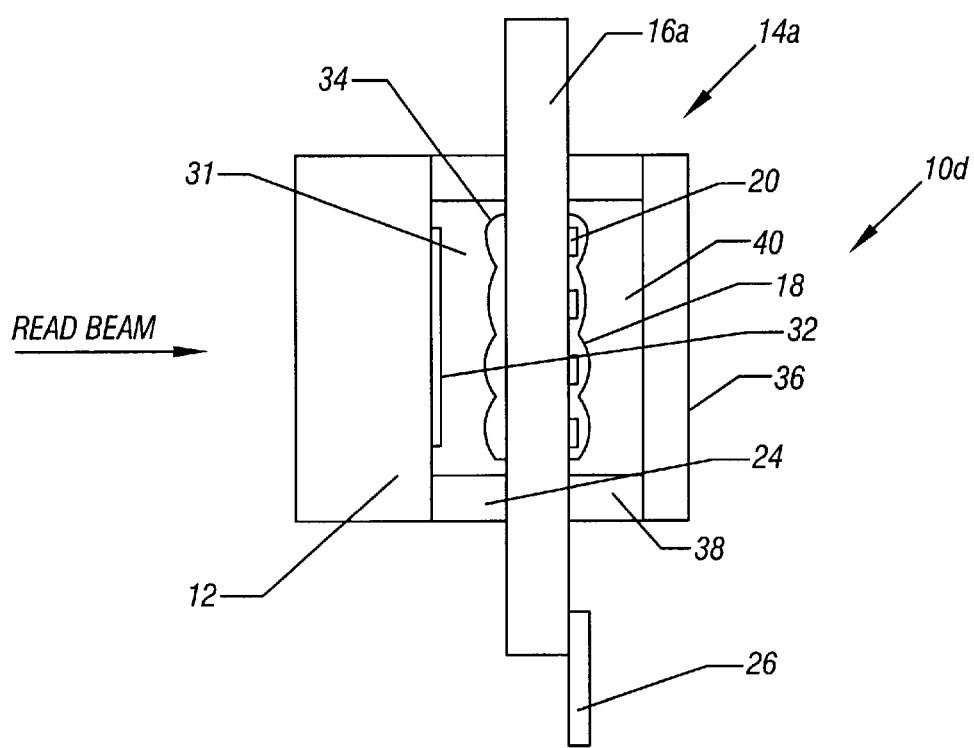
FIG. 5 is an enlarged cross-sectional view of still another embodiment of the present invention.

Turning finally to FIG. 5, an optically addressable spatial light modulator 10d includes an OLED display 14a using a transparent substrate 16a. The light developed by the OLED material devices 20 passes through the transparent substrate 16a, through the microlens array 34, through an air gap 31, and finally through a filter 32 to the light valve 12.

A sealant 24 seals the region on the output side of the substrate 16a. Similarly, a sealant 38 seals the region containing the devices 20. In some embodiments, a filler 40 may be formed in the region defined inside the cover 36. The filler 40 may include a dessicant in some embodiments. The passivation 18 may cover the device 20 in some embodiments.

In still other embodiments, the OLED display 14 may be formed on the side of the substrate 16 adjacent the light valve 12. Drive electronics (not shown) may be disposed on the other side of the substrate 16. The substrate 16 may include a ceramic material such as alumina, with interconnecting vias coupling the OLED address lines to the drive electronics. See PCT patent application publication no. WO 99/41732 dated Aug. 19, 1999. As still another alternative, the OLED display 14 may be replaced with thin film electroluminescent (TFEL) devices, such as those sold by Planar Systems, Inc., 1400 NW Compton Drive, Beaverton, Oreg. 97006–1992, with either passive or active matrix addressing.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An optically addressed spatial light modulator comprising:

a light valve; and a light emitting device display physically integrated with said light valve.

2. The modulator of claim 1 wherein said display is arranged to develop the write beam for said light valve.

3. The modulator of claim 1 wherein the region between said light valve and said display is sealed.

4. The modulator of claim 1 wherein said write and read beams are different beams.

5. The modulator of claim 1 wherein said write and read beams are the same beam.

6. The modulator of claim 1 including a microlens array between said light valve and said display.

7. The modulator of claim 1 including a filter between said light valve and said display.

8. The modulator of claim 1 wherein said display includes a substrate, said display emitting light through said substrate.

9. The modulator of claim 1, said display including a substrate, said display emitting light away from said substrate to said light valve.

10. The modulator of claim 1 wherein said light emitting device is an organic light emitting device.

11. A method comprising forming an optically addressed spatial light modulator by integrating a light valve and a light emitting device display.

12. The method of claim 11 including physically mounting the light emitting device display on the light valve.

13. The method of claim 11 including sealing the region between said light valve and said light emitting device display.

14. The method of claim 11 including developing the write beam from the display for the light valve.

15. The method of claim 11 including using different write and read beams.

16. The method of claim 11 including using the same beam for the write and read beams.

17. The method of claim 11 including positioning a microlens between said light valve and said display.

18. The method of claim 11 including positioning a filter between said light valve and said display.

19. The method of claim 11 including generating light from said display through the display substrate.

20. The method of claim 11 including using organic light emitting devices in said display.

21. An optically addressed spatial light modulator comprising:

a light valve; and an integrated organic light emitting device display formed on said light valve.

22. The modulator of claim 21 wherein said display is arranged to develop the write beam for said light valve.

23. The modulator of claim 21 wherein the region between said light valve and said display is sealed.

24. The modulator of claim 21 wherein said write and read beams are different beams.

25. The modulator of claim 21 wherein said write and read beams are the same beam.

26. The modulator of claim 21 including a microlens array between said light valve and said display.

27. The modulator of claim 1 including a filter between said light valve and said display.

28. The modulator of claim 21 wherein said display includes a substrate, said display may emit light through said substrate.

* * * * *